United States Patent
Natsui et al.

(10) Patent No.: US 12,512,459 B2
(45) Date of Patent: Dec. 30, 2025

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Ryuichi Natsui, Osaka (JP); Junko Matsushita, Osaka (JP); Mitsuhiro Hibino, Kyoto (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 263 days.

(21) Appl. No.: 18/028,364

(22) PCT Filed: Sep. 14, 2021

(86) PCT No.: PCT/JP2021/033793
§ 371 (c)(1),
(2) Date: Mar. 24, 2023

(87) PCT Pub. No.: WO2022/070898
PCT Pub. Date: Apr. 7, 2022

(65) Prior Publication Data
US 2023/0402594 A1    Dec. 14, 2023

(30) Foreign Application Priority Data

Sep. 30, 2020   (JP) .................. 2020-166027

(51) Int. Cl.
| | | |
|---|---|---|
| H01M 4/1315 | (2010.01) | |
| C01G 53/50 | (2025.01) | |
| H01M 4/131 | (2010.01) | |
| H01M 4/485 | (2010.01) | |
| H01M 4/505 | (2010.01) | |
| H01M 4/525 | (2010.01) | |
| H01M 10/0525 | (2010.01) | |
| H01M 4/02 | (2006.01) | |

(52) U.S. Cl.
CPC .......... *H01M 4/1315* (2013.01); *C01G 53/50* (2013.01); *H01M 4/131* (2013.01); *H01M 4/485* (2013.01); *H01M 4/505* (2013.01); *H01M 4/525* (2013.01); *H01M 10/0525* (2013.01); *C01P 2002/52* (2013.01); *C01P 2006/40* (2013.01); *H01M 2004/028* (2013.01)

(58) Field of Classification Search
CPC ...... H01M 4/505; H01M 4/525; H01M 4/131; H01M 4/1315; H01M 2004/028; H01M 10/0525; H01M 4/485; C01G 53/50; C01P 2002/52
See application file for complete search history.

(56) References Cited

U.S. PATENT DOCUMENTS

| | | | |
|---|---|---|---|
| 2019/0036113 A1* | 1/2019 | Ishikawa | ............... H01M 4/525 |
| 2019/0198861 A1 | 6/2019 | Natsui et al. | |
| 2020/0044249 A1 | 2/2020 | Natsui et al. | |
| 2023/0071732 A1 | 3/2023 | Natsui et al. | |

FOREIGN PATENT DOCUMENTS

| | | |
|---|---|---|
| JP | 2007-145695 A | 6/2007 |
| JP | 5946011 B2 | 7/2016 |
| WO | 2018/100792 A1 | 6/2018 |
| WO | 2018/198410 A1 | 11/2018 |
| WO | 2020/003848 A1 | 1/2020 |
| WO | 2021/172010 A1 | 9/2021 |

OTHER PUBLICATIONS

International Search Report dated Nov. 9, 2021, issued in counterpart International Application No. PCT/JP2021/033793 (2 pages).

* cited by examiner

*Primary Examiner* — Laura Weiner
(74) *Attorney, Agent, or Firm* — WHDA, LLP

(57) ABSTRACT

This positive electrode active material for nonaqueous electrolyte secondary batteries contains a lithium transition metal composite oxide that is represented by composition formula $Li_xMn_yNi_zP_aM_bO_{2-c}F_c$ (wherein M represents at least one element that is selected from among Ti, Co, Si, Sr, Nb, W, Mo, Ca, Mg, Sb, Na, B, V, Cr, Fe, Cu, Zn, Ge, Zr, Ru, K and Bi; $1.0<x\leq1.2$; $0.4\leq y\leq0.8$; $0\leq z\leq0.4$; $0<a<0.01$; $0<b<0.05$; $0<c<0.1$; and $(x+y+z+a+b)\leq2$).

10 Claims, 1 Drawing Sheet

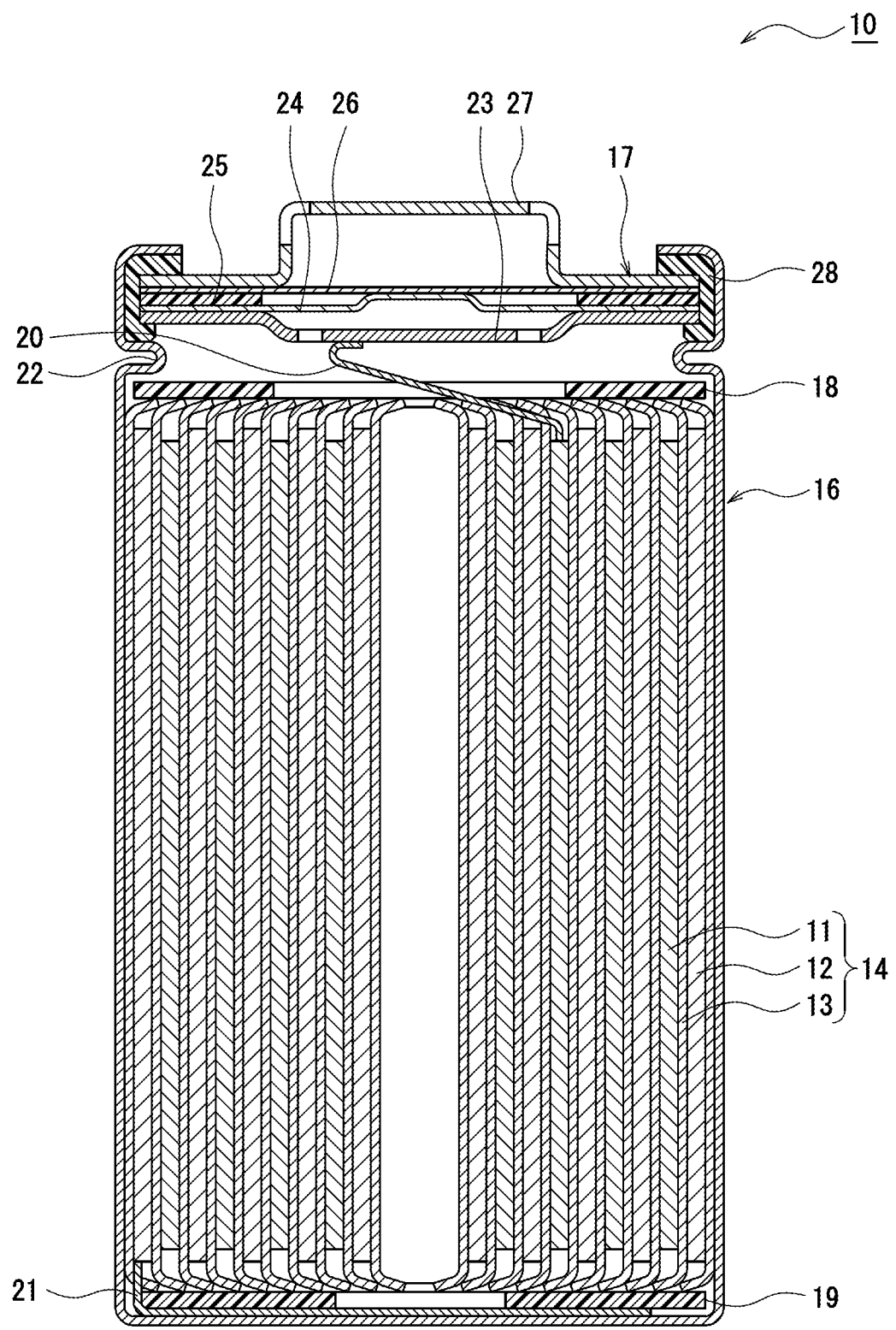

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2021/033793 filed on Sep. 14, 2021 which claims the benefit of priority under 35 U.S.C. § 119 (a) of Japanese Patent Application No. 2020-166027 filed in Japan on Sep. 30, 2020, the contents of which are incorporated herein by reference.

TECHNICAL FIELD

The present disclosure relates to a positive electrode active material for a non-aqueous electrolyte secondary battery and a non-aqueous electrolyte secondary battery using the positive electrode active material.

BACKGROUND ART

In a non-aqueous electrolyte secondary battery such as a lithium-ion battery, a positive electrode active material significantly affects battery performance such as input-output characteristics, a capacity, and cycle characteristics. For the positive electrode active material, a lithium-transition metal composite oxide containing metal elements such as Ni, Co, Mn, and Al is commonly used. Since the lithium-transition metal composite oxide has significantly different properties depending on its composition, many investigations have been made on the kind and amount of additive elements.

For example, Patent Literature 1 discloses an active material for a non-aqueous electrolyte secondary battery represented by the general formula $Li_aCo_xNi_yMn_zO_2X_b$, wherein X represents one or two or more selected from the group consisting of F, Cl, P, and S, a/(x+y+z) is 1.25 to 1.40, x/(x+y+z) is 0.02 to 0.23, z/(x+y+z) is 0.63 to 0.72, b/a is 0.01 to 0.1, and a+x+y+z=2. Patent Literature 1 describes that the active material has a feature of a small BET specific surface area and a large discharge capacity.

CITATION LIST

Patent Literature

PATENT LITERATURE 1: Japanese Patent No. 5946011

SUMMARY

A lithium-excess composite oxide, which has a molar ratio of Li to transition metals of more than 1, is promising as a next-generation positive electrode active material with high capacity; however, a problem is that, for example, the transition metals are easily eluted. Adding F to the lithium-excess composite oxide is known to inhibit the elution of the transition metal, resulting in improved durability; in this case, however, there is a problem of increase in the resistance, resulting in lowered capacity.

A positive electrode active material for a non-aqueous electrolyte secondary battery of an aspect of the present disclosure includes a lithium-transition metal composite oxide represented by the composition formula $Li_xMn_yNi_z$-$P_aM_bO_{2-c}F_c$, wherein M represents at least one element selected from the group consisting of Ti, Co, Si, Sr, Nb, W, Mo, Ca, Mg, Sb, Na, B, V, Cr, Fe, Cu, Zn, Ge, Zr, Ru, K, Bi, and Al, $1.0<x\leq1.2$, $0.4\leq y\leq0.8$, $0\leq z\leq0.4$, $0<a<0.01$, $0<b<0.05$, $0<c<0.1$, and $x+y+z+a+b\leq2$.

A non-aqueous electrolyte secondary battery of an aspect of the present disclosure comprises: a positive electrode including the above positive electrode active material; a negative electrode; a separator interposed between the positive electrode and the negative electrode; and a non-aqueous electrolyte.

According to an aspect of the present disclosure, higher capacity can be achieved with a F-containing lithium-excess positive electrode active material having high durability. That is, the positive electrode active material of an aspect of the present disclosure has high durability and high capacity.

BRIEF DESCRIPTION OF DRAWING

FIG. 1 is a sectional view of a non-aqueous electrolyte secondary battery of an example of an embodiment.

DESCRIPTION OF EMBODIMENTS

As described above, adding F to the lithium-excess composite oxide inhibits the elution of the transition metal, resulting in improved durability. On the other hand, the resistance increases, resulting in lowered capacity. The present inventors have made intensive investigation to solve this problem, and consequently found that adding P and at least one specific element M to a lithium-excess F-containing composite oxide containing at least Mn as a transition metal can increase the capacity. When P and the specific element M are present, the capacity specifically increases compared with a case when any one or both of them are absent.

Adding only the element M without P to the lithium-excess F-containing composite oxide cannot increase the capacity. Adding only P without the element M rather lowers the capacity. Only using P and the element M in combination yields a specific interaction, and the higher capacity can be achieved. In addition, when two or more elements M are added together with P, the effect of increasing the capacity becomes more remarkable.

Hereinafter, an example of embodiments of the positive electrode active material for a non-aqueous electrolyte secondary battery according to the present disclosure and a non-aqueous electrolyte secondary battery using the positive electrode active material will be described in detail with reference to the drawings. It is anticipated from the beginning to selectively combine a plurality of embodiments and modified examples described below.

Hereinafter, a cylindrical battery in which a wound electrode assembly 14 is housed in a bottomed cylindrical exterior housing can 16 will be exemplified, but an exterior is not limited to a cylindrical exterior housing can, and may be, for example, a rectangular exterior housing can (rectangular battery), a coin-shaped exterior housing can (coin battery), or an exterior composed of laminated sheets including a metal layer and a resin layer (laminate battery). The electrode assembly is not limited to the wound electrode assembly, and may be a stacked electrode assembly in which a plurality of positive electrodes and a plurality of negative electrodes are alternately stacked with a separator interposed therebetween.

FIG. 1 is a sectional view of a non-aqueous electrolyte secondary battery 10 of an example of an embodiment. As illustrated in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substituted derivative in which hydrogen of these solvents is at least partially substituted with a halogen atom such as fluorine. For the electrolyte salt, a lithium salt such as $LiPF_6$ is used, for example. The non-aqueous electrolyte is not limited to a liquid electrolyte, and may be a solid electrolyte.

All of the positive electrode 11, negative electrode 12, and separator 13 that constitute the electrode assembly 14 have an elongated band-shape, and are spirally wound to be alternately stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). The separator 13 is formed in one size larger than at least the positive electrode 11. For example, two separators 13 are disposed so as to sandwich the positive electrode 11. The electrode assembly 14 has a positive electrode lead 20 connected to the positive electrode 11 by welding or the like, and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends along an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a grooved portion 22 in which part of a side wall thereof projects inside for supporting the sealing assembly 17 is formed. The grooved portion 22 is preferably formed in a circular shape along a circumferential direction of the exterior housing can 16, and supports the sealing assembly 17 with the upper surface thereof. The sealing assembly 17 is fixed on the upper part of the exterior housing can 16 with the grooved portion 22 and with an end of the opening of the exterior housing can 16 caulked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected to each other. The lower vent member 24 and the upper vent member 26 are connected at respective central parts thereof, and the insulating member 25 is interposed between the respective circumferential parts of the vent members 24 and 26. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, the negative electrode 12, and the separator 13, which constitute the electrode assembly 14, particularly a positive electrode active material constituting the positive electrode 11, will be described in detail.

[Positive Electrode]

The positive electrode 11 has a positive electrode core and a positive electrode mixture layer provided on a surface of the positive electrode core. For the positive electrode core, a foil of a metal stable within a potential range of the positive electrode 11, such as aluminum and an aluminum alloy, a film in which such a metal is disposed on a surface layer thereof, and the like may be used. The positive electrode mixture layer includes a positive electrode active material, a conductive agent, and a binder, and is preferably provided on both surfaces of the positive electrode core. The positive electrode 11 may be produced by, for example, applying a positive electrode mixture slurry including the positive electrode active material, the conductive agent, the binder, and the like on the positive electrode core, drying and subsequently compressing the applied film to form the positive electrode mixture layers on both the surfaces of the positive electrode core.

Examples of the conductive agent included in the positive electrode mixture layer may include a carbon material such as carbon black, acetylene black, Ketjenblack, and graphite. Examples of the binder included in the positive electrode mixture layer may include a fluororesin such as polytetrafluoroethylene (PTFE) and polyvinylidene fluoride (PVdF), polyacrylonitrile (PAN), a polyimide resin, an acrylic resin, and a polyolefin resin. With these resins, a cellulose derivative such as carboxymethylcellulose (CMC) or a salt thereof, polyethylene oxide (PEO), and the like may be used in combination.

The positive electrode active material includes a lithium-transition metal composite oxide represented by the composition formula $Li_xMn_yNi_zP_aM_bO_{2-c}F_c$, wherein M represents at least one element selected from the group consisting of Ti, Co, Si, Sr, Nb, W, Mo, Ca, Mg, Sb, Na, B, V, Cr, Fe, Cu, Zn, Ge, Zr, Ru, K, Bi, and Al, $1.0 < x \leq 1.2$, $0.4 \leq y \leq 0.8$, $0 \leq z \leq 0.4$, $0 < a < 0.01$, $0 < b < 0.05$, $0 < c < 0.1$, and $x+y+z+a+b \leq 2$. The composite oxide is a Li-excess material, which has a molar ratio of Li to transition metals of more than 1. In the composite oxide, a predetermined amount of fluoride ions is introduced, and O is partially replaced with F.

The positive electrode active material contains the composite oxide represented by the above composition formula as a main component. Here, the main component means a component with the largest mass proportion among constituents of the composite oxide. For the positive electrode 11, a composite oxide other than the composite oxide represented by the above composition formula (for example, a composite oxide being not Li-excess and a composite oxide containing no fluoride ion) may be used in combination as the positive electrode active material. However, a content of the composite oxide is preferably 50 mass % or more, and may be substantially 100 mass %. The composition of the composite oxide may be measured by using an ICP atomic emission spectrometer (iCAP6300, manufactured by Thermo Fisher Scientific K. K.).

The lithium-transition metal composite oxide represented by the above composition formula preferably contains Ni in addition to Li, Mn, and P. Ni contributes to a higher capacity. In addition, the lithium-transition metal composite oxide contains at least one element M selected from the group consisting of Ti, Co, Si, Sr, Nb, W, Mo, Ca, Mg, Sb, Na, B, V, Cr, Fe, Cu, Zn, Ge, Zr, Ru, K, Bi, and Al as an essential component. Among them, Ti, Co, Si, Sr, Nb, Mg, Sb, Ge, and Al are preferable, and Ti, Co, Nb, and Sb are more preferable. When the composite oxide contains P and contains no element M, addition of P rather lowers the capacity. The element M alone cannot yield the effect of improving the capacity. Only when P and the element M are used in combination, the capacity specifically increases.

The lithium-transition metal composite oxide represented by the above composition formula more preferably contains two or more elements M. In particular, two or more elements selected from Ti, Co, Si, Sr, Nb, Mg, Sb, Ge, and Al are preferable. For example, among the two or more elements M, at least one is selected from Ti, Co, Nb, Sb, and Al. The two or more elements M may be selected from Ti, Co, Nb, Sb, and Al. Adding the two or more elements M makes the effect of improving the capacity more remarkable.

When the lithium-transition metal composite oxide contains the two or more elements M. Examples of preferable combination of the elements M include: (1) Ti and Co; (2) Ti and Nb; (3) Ti and Sb; (4) Co and Nb; (5) Co and Sb; (6) Nb and Sb; and (7) Sb and Al. The lithium-transition metal composite oxide may contain another element M in addition to these two elements M. Examples of preferable combination of three elements M include: Co, Al and Ti; Co, Sb, and Ti; and Co, Sb, and Ge. The lithium-transition metal composite oxide contains, for example, not more than 5 kinds or not more than 4 kinds of element M.

Since Co is particularly rare and expensive, the lithium-transition metal composite oxide may contain substantially no Co. Even when another element M is used instead of Co, an effect of improving the capacity equal to or more than the case of containing Co can be obtained.

In the composition formula, the molar proportion of Li (x) satisfies $1.0 < x \leq 1.2$, preferably $1.1 \leq x \leq 1.2$. The molar proportion of Mn (y) satisfies $0.4 \leq y \leq 0.8$, preferably $0.45 \leq y \leq 0.6$. When the molar proportions of Li and Mn are within the above ranges, the effect of improving the capacity more remarkably appears. Ni, which is an optional component, is preferably contained at an amount smaller than the amount of Mn, for example. A preferable content (molar proportion) of Ni satisfies $0.05 \leq z \leq 0.3$.

In the composition formula, a total molar amount of Li, Vin, Ni, P, and the element M (x+y+z+a+b) is 2 or less, and preferably 2. That is, the composite oxide is preferably a Li-excess composite oxide and is preferably not a cation-excess composite oxide. The molar proportion of F (c) satisfies $0 < c \leq 0.1$, preferably $0.05 \leq x \leq 0.085$. Adding the predetermined amount of F inhibits the elution of the transition metal, resulting in improved durability.

In the composition formula, a total molar amount of Li, Mn, Ni, P, and the element M (x+y+z+a+b) is 2 or less, and preferably 2. That is, the composite oxide is preferably a Li-excess composite oxide and is preferably not a cation-excess composite oxide. The molar proportion of F (c) satisfies $0 < c \leq 0.1$, preferably $0.05 \leq c \leq 0.085$. Adding the predetermined amount of F inhibits the elution of the transition metal, resulting in improved durability.

In the lithium-transition metal composite oxide represented by the above composition formula, a ratio of contents between P and the element M is not particularly limited, but a preferable range of the ratio is slightly different depending on the kinds of the element M, and the like. For example, when one selected from Sb, Sr, Ti, Mg, Nb, and Si is contained as the element M, the content of P is set to be equal to or higher than the content of the metal element M. When the element M is Co or Al, the content of P is set to be equal to or lower than the content of the metal element M. The lithium-transition metal composite oxide may contain an element other than Li, Mn, Ni, P, the element M, O, and F within a range not impairing the object of the present disclosure.

The lithium-transition metal composite oxide is of, for example, secondary particles formed by aggregation of a plurality of primary particles. An example of a median diameter (D50) on a volumetric basis of the lithium-transition metal composite oxide is 1 to 20 μm or 2 to 15 μm. The D50 is a particle diameter at which a volumetric integrated value is 50% in a particle size distribution measured by a laser diffraction scattering method. A BET specific surface area of the lithium-transition metal composite oxide is, for example, 1.0 to 4.0 mm$^2$/g. When the BET specific surface area is within the above range, both the high durability and the high capacity are easily achieved. The BET specific surface area is measured in accordance with a BET method (nitrogen adsorption method) described in JIS R1626.

The lithium-transition metal composite oxide represented by the above composition formula may be synthesized by: mixing a carbonate salt containing Mn and Ni, a compound containing P, a compound containing the element M, and lithium fluoride (LiF); and calcining the mixture, for example. An example of the calcination condition is 700 to 900° C.×10 to 30 hours. The compound containing P may be added, after the other components are mixed and calcined, to the calcined product. In this case, P is easily present unevenly on the particle surfaces of the lithium-transition metal composite oxide.

Examples of the compound containing P include lithium phosphate and diphosphous pentoxide. Examples of the compound containing the element M include cobalt sulfate, diantimony trioxide, aluminum oxide, titanium oxide, magnesium oxide, niobium oxide, silicon oxide, and germanium oxide.

As described above, the positive electrode active material contains the lithium-transition metal composite oxide represented by the composition formula $Li_xMn_yNi_zP_aM_bO_{2-c}F_c$ as a main component. The element M is at least one, preferably two or more selected from the group consisting of Ti, Co, Si, Sr, Nb, W, Mo, Ca. Mg, Sb, B, V, Cr, Fe, Cu, Zn, Ge, Zr. Ru. K. Bi, and Al. Based on the total number of moles of the elements excluding Li, O, and F, a preferable range of the content P is, for example, 0.2 to 1 mol %, and a preferable range of the content of the element M is, for example, 2 mol % or less.

[Negative Electrode]

The negative electrode 12 has a negative electrode core and a negative electrode mixture layer provided on a surface of the negative electrode core. For the negative electrode core, a foil of a metal stable within a potential range of the negative electrode 12, such as copper, a film in which such a metal is disposed on a surface layer thereof, and the like may be used. The negative electrode mixture layer includes a negative electrode active material and a binder, and is preferably provided on both surfaces of the negative electrode core. The negative electrode 12 may be produced by, for example, applying a negative electrode mixture slurry including the negative electrode active material, a conductive agent, the binder, and the like on the surface of the negative electrode core, drying and subsequently compressing the applied film to form the negative electrode mixture layers on both the surfaces of the negative electrode core.

The negative electrode mixture layer includes, for example, a carbon-based active material to reversibly occlude and release lithium ions, as the negative electrode active material. A preferable carbon-based active material is a graphite such as: a natural graphite such as flake graphite, massive graphite, and amorphous graphite; or an artificial graphite such as massive artificial graphite (MAG) and graphitized mesophase-carbon microbead (MCMB). For the negative electrode active material, an Si-based active material composed of at least one of the group consisting of Si and an Si-containing compound may also be used, and the carbon-based active material and the Si-based active material may be used in combination.

For the conductive agent included in the negative electrode mixture layer, a carbon material such as carbon black, acetylene black, Ketjenblack, and graphite may be used similar to that in the positive electrode 11. For the binder included in the negative electrode mixture layer, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

[Separator]

For the separator 13, a porous sheet having an ion permeation property and an insulation property is used. Specific examples of the porous sheet include a fine porous thin film, a woven fabric, and a nonwoven fabric. For a material of the separator 13, a polyolefin such as polyethylene, polypropylene, and a copolymer of ethylene and an α-olefin, cellulose, and the like are preferable. The separator 13 may have any of a single-layered structure and a multi-layered structure. On a surface of the separator 13, a heat-resistant layer including inorganic particles, a heat-resistant layer composed of a highly heat-resistant resin such as an aramid resin, a polyimide, and a polyamideimide, and the like may be formed.

EXAMPLES

Hereinafter, the present disclosure will be further described with Examples, but the present disclosure is not limited to these Examples.

Example 1

Synthesis of Lithium-Transition Metal Composite Oxide

A carbonate salt containing Mn and Ni at a molar ratio of 2:1, lithium phosphate (compound containing P), diantimony trioxide (compound containing the element M), and lithium fluoride were mixed, and the mixture was calcined at 800° C. for 20 hours under an oxygen flow to obtain a lithium-transition metal composite oxide represented by the composition formula $Li_{1.167}Mn_{0.55}Ni_{0.275}P_{0.0065}Sb_{0.001}O_{1.92}F_{0.08}$.

Production of Positive Electrode

The above lithium-transition metal composite oxide was used as a positive electrode active material. The positive electrode active material, acetylene black, and polyvinylidene fluoride were mixed at a solid-content mass ratio of 7:2:1, and N-methyl-2-pyrrolidone (NMP) was used as a dispersion medium to prepare a positive electrode mixture slurry. Then, the positive electrode mixture slurry was applied on a positive electrode core made of aluminum foil, the applied film was dried and compressed, and then cut to a predetermined electrode size to obtain a positive electrode.

Preparation of Non-Aqueous Electrolyte Liquid

Ethylene carbonate (EC), ethyl methyl carbonate (EMC), and dimethyl carbonate (DMC) were mixed at a predetermined volume ratio. To this mixed solvent, $LiPF_6$ was added to obtain a non-aqueous electrolyte liquid.

Production of Test Cell

The above positive electrode and a negative electrode composed of a lithium metal foil were disposed opposite to each other with a separator interposed therebetween to constitute an electrode assembly, and the electrode assembly was housed in a coin-shaped exterior housing can. The above non-aqueous electrolyte liquid was injected into the exterior housing can, and then the exterior housing can was sealed to obtain a coin-shaped test cell (non-aqueous electrolyte secondary battery).

An initial capacity of the test cell was evaluated by the following method. Table 1 shows the evaluation results together with contents of P and the element M in the positive electrode active material.

Evaluation of Initial Capacity

Under an environment at a normal temperature, the test cell was CC-charged at a constant current at 0.05 C until a battery voltage of 5.2 V, then rest for 20 minutes, and CC-discharged at a constant current of 0.05 C until the battery voltage of 2.5 V to measure a discharge capacity.

Examples 2 to 15 and Comparative Examples 1 to 6

Test cells were produced to evaluate initial capacities in the same manner as in Example 1 except that, in the synthesis of the lithium-transition metal composite oxide, kinds of the raw materials and a mixing ratio of the raw materials were changed so as to have P and the element M having the contents shown in Table 1 (the content rates of Li, Ni, Mn, O, and F were same as in Example 1). Note that an oxide was used for a compound each containing Co, Sr, Al, Ti, Mg, Nb, Si, or Ge.

excess F-containing composite oxide containing Mn and Ni as the transition metals), the initial capacity of the test cell was remarkably improved compared with the case of using the positive electrode active material of Comparative Example 1. When the two or more elements M were added together with P, the effect of improving the capacity more remarkably appeared (Examples 11 to 15).

Although Examples show the cases of using Co, Sb, Sr, Al, Ti, Mg, Nb, Si, or Ge as the element M, using, in addition to or instead of these elements, W, Mo, Ca, Na, B, V, Cr, Fe, Cu, Zn, Zr, Ru, K, or Bi also yields the same effect of improving the capacity.

TABLE 1

| | Contents of P and M in positive electrode active material (mol %) | | | | | | | | | Initial capacity |
|---|---|---|---|---|---|---|---|---|---|---|
| | P | Co | Sb | Sr | Al | Ti | Mg | Nb | Si | Ge | (Wh/L) |
| Example 1 | 0.65 | | 0.1 | | | | | | | | 4160 |
| Example 2 | 0.9 | | 0.15 | | | | | | | | 4184 |
| Example 3 | 0.95 | | | 0.05 | | | | | | | 4126 |
| Example 4 | 0.25 | | | 0.25 | | | | | | | 4154 |
| Example 5 | 0.8 | | | | 1.0 | | | | | | 4134 |
| Example 6 | 1.0 | 0.35 | | | | | | | | | 4165 |
| Example 7 | 0.25 | | | | | 0.25 | | | | | 4195 |
| Example 8 | 0.25 | | | | | | 0.25 | | | | 4194 |
| Example 9 | 0.25 | | | | | | | 0.25 | | | 4123 |
| Example 10 | 0.25 | | | | | | | | 0.25 | | 4184 |
| Example 11 | 0.25 | | 0.5 | | 3.0 | | | | | | 4205 |
| Example 12 | 0.25 | 0.75 | | | | | | 0.5 | | | 4141 |
| Example 13 | 0.25 | 0.75 | 0.25 | | | | | | | 0.5 | 4216 |
| Example 14 | 0.25 | 0.5 | 0.25 | | | 0.5 | | | | | 4229 |
| Example 15 | 0.3 | 0.3 | | | 0.3 | 0.3 | | | | | 4245 |
| Comparative Example 1 | | | | | | | | | | | 4070 |
| Comparative Example 2 | 1.0 | | | | | | | | | | 3973 |
| Comparative Example 3 | 0.5 | | | | | | | | | | 4060 |
| Comparative Example 4 | | 1.0 | | | | | | | | | 4086 |
| Comparative Example 5 | | 1.0 | 0.5 | 0.5 | 1.0 | | | | | | 4079 |
| Comparative Example 6 | | 0.25 | | | 0.25 | 0.25 | 0.25 | | | | 4065 |

As shown in Table 1, any of the test cells of Examples have remarkably improved initial capacity compared with the test cells of Comparative Examples. On the test cells of Examples and Comparative Examples, the difference is only the composition of the positive electrode active material, and the other constitution is same, as described above. The positive electrode active materials of Examples are the lithium-excess composite oxides represented by the composition formula $Li_xMn_yNi_zP_aM_bO_{2-c}F_c$, wherein $1.0<x\le1.2$, $0.4\le y\le0.8$, $0\le z\le0.4$, $0<a<0.01$, $0<b<0.05$, $0<c<0.1$ and $x+y+z+a+b\le2$. On the other hand, the positive electrode active materials used for the test cells of Comparative Examples are not represented by this composition formula. Therefore, it is understood that using the composite oxide represented by this composition formula specifically improves the capacity.

When the positive electrode active material containing neither P nor the element M was used, the initial capacity of the test cell was 4070 Wh/L (Comparative Example 1). When the positive electrode active material containing only P and containing no element M was used, the initial capacity of the test cell was lowered compared with the case of using the positive electrode active material containing neither P nor the element M (Comparative Examples 2 and 3). That is, adding only P to the composite oxide rather lowers the capacity. When the positive electrode active material in which only the element M was added was used, the effect of improving the capacity was also not observed compared with the case of using the positive electrode active material containing neither P nor the element M (Comparative Examples 4 to 6).

In contrast, when the positive electrode active material in which the predetermined amounts of P and the one or more elements M were added to the composite oxide (lithium-

REFERENCE SIGNS LIST

10 Non-aqueous electrolyte secondary battery
11 Positive electrode
12 Negative electrode
13 Separator
14 Electrode assembly
16 Exterior housing can
17 Sealing assembly
18, 19 Insulating plate
20 Positive electrode lead
21 Negative electrode lead
22 Grooved portion
23 Internal terminal plate
24 Lower vent member
25 Insulating member
26 Upper vent member
27 Cap
28 Gasket

The invention claimed is:
1. A positive electrode active material for a non-aqueous electrolyte secondary battery, including a lithium-transition metal composite oxide represented by the composition formula $Li_xMn_yNi_zP_aM_bO_{2-c}F_c$, wherein M represents at least one element selected from the group consisting of Ti, Co, Si, Sr, Nb, W, Mo, Ca, Mg, Sb, Na, B, V, Cr, Fe, Cu, Zn, Ge, Zr, Ru, K, Bi, and Al, $1.0<x\leq1.2$, $0.4\leq y\leq0.8$, $0\leq z\leq0.4$, $0.002\leq a<0.01$, $0<b<0.05$, $0<c<0.1$, and $x+y+z+a+b\leq2$.

2. The positive electrode active material for a non-aqueous electrolyte secondary battery according to claim 1, wherein M represents two or more elements.

3. The positive electrode active material for a non-aqueous electrolyte secondary battery according to claim 2, wherein the two or more M are selected from Ti, Co, Nb, Sb, and Al, and a molar proportion of M (b) satisfies $0<b<0.035$.

4. The positive electrode active material for a non-aqueous electrolyte secondary battery according to claim 1, wherein in the composition formula $Li_xMn_yNi_zP_aM_bO_{2-c}F_c$, a molar proportion of P (a) satisfies $0.002\leq a\leq0.005$.

5. The positive electrode active material for a non-aqueous electrolyte secondary battery according to claim 1, wherein in the composition formula $Li_xMn_yNi_zP_aM_bO_{2-c}F_c$, a molar proportion of F (c) satisfies $0.05\leq c\leq0.085$.

6. The positive electrode active material for a non-aqueous electrolyte secondary battery according to claim 1, wherein in the composition formula $Li_xMn_yNi_zP_aM_bO_{2-c}F_c$, a molar proportion of Ni (z) satisfies $0.05\leq z<0.3$.

7. The positive electrode active material for a non-aqueous electrolyte secondary battery according to claim 1, wherein M represents one or more elements selected from the group consisting of Ti, Co, Si, Sr, Nb, Mg, Sb, Ge, and Al.

8. The positive electrode active material for a non-aqueous electrolyte secondary battery according to claim 1, wherein M contains at least Ti.

9. The positive electrode active material for a non-aqueous electrolyte secondary battery according to claim 8, wherein the composition formula contains no Co.

10. A non-aqueous electrolyte secondary battery, comprising:
   a positive electrode including the positive electrode active material according to claim 1;
   a negative electrode;
   a separator interposed between the positive electrode and the negative electrode; and
   a non-aqueous electrolyte.

* * * * *